(12) United States Patent
Yang et al.

(10) Patent No.: US 9,857,604 B2
(45) Date of Patent: Jan. 2, 2018

(54) STEREOSCOPIC DISPLAY

(71) Applicant: CHERAY CO. LTD., Hsinchu (TW)

(72) Inventors: Chun-Hsiang Yang, Hsinchu (TW);
Yi-Pai Huang, Hsinchu (TW);
Chih-Hung Ting, New Taipei (TW);
Ping-Yen Chou, Taipei (TW);
Chih-Wei Shih, Hsinchu (TW); Jui-Yi Wu, Miaoli County (TW); Chia-Yu Lee, Hsinchu (TW)

(73) Assignee: CHERAY CO. LTD., Hsinchu (TW)

( * ) Notice: Subject to any disclaimer, the term of this patent is extended or adjusted under 35 U.S.C. 154(b) by 0 days.

(21) Appl. No.: 15/401,853

(22) Filed: Jan. 9, 2017

(65) Prior Publication Data

US 2017/0219838 A1   Aug. 3, 2017

(30) Foreign Application Priority Data

Feb. 1, 2016   (TW) ............... 105103126 A (51) Int. Cl.
*G02B 27/22* (2006.01)
*G02B 3/00* (2006.01)

(52) U.S. Cl.
CPC ....... *G02B 27/2292* (2013.01); *G02B 3/0056* (2013.01); *G02B 27/2214* (2013.01); *G02B 27/2242* (2013.01)

(58) Field of Classification Search
CPC ............ G02B 27/2292; G02B 27/2214; G02B 27/2242; G02B 3/0056
USPC ......................................................... 359/463
See application file for complete search history.

(56) References Cited

U.S. PATENT DOCUMENTS

| 2,499,453 A | * | 3/1950 | Bonnet | G03B 35/24 |
| | | | | 359/463 |
| 2,522,812 A | * | 9/1950 | Bonnet | G03B 35/24 |
| | | | | 359/463 |
| 7,529,028 B2 | * | 5/2009 | Shestak | G02B 27/2292 |
| | | | | 359/622 |

(Continued)

FOREIGN PATENT DOCUMENTS

| TW | 201020592 A1 | 6/2010 |
| TW | 201044022 A1 | 12/2010 |
| TW | 201514558 A | 4/2015 |

OTHER PUBLICATIONS

Yuichi Taguchi, et al., "TransCAIP: A Live 3D System Using a Camera Array and an Integral Photography Display with Interactive Control of Viewing Parameters", Sep./Oct. 2009, IEEE Transactions on Visualization and Computer Graphics, vol. 15, No. 5.

*Primary Examiner* — Ricky D Shafer
(74) *Attorney, Agent, or Firm* — Li & Cai Intellectual Property (USA) Office (57) ABSTRACT

A stereoscopic display comprises a flat-panel display and an optical layer disposed thereon. The optical layer further includes a lens array layer and a micro-structure layer. The flat-panel display has a display plane. The lens array layer has a base and a plurality of lens with focusing function. The lens array layer adjusts the light field. The micro-structure layer connects to the lens array layer, and includes a substrate and a plurality of micro structures. The micro-structure layer modulates the direction of light so that a stereo image which allows an oblique angle of view natural to the user is displayed.

10 Claims, 8 Drawing Sheets

(56) References Cited

U.S. PATENT DOCUMENTS

| | | | |
|---|---|---|---|
| 2005/0122584 A1* | 6/2005 | Ishikawa | G06F 3/0346 |
| | | | 359/463 |
| 2005/0185276 A1* | 8/2005 | Tomisawa | G02B 27/2214 |
| | | | 359/472 |
| 2010/0232015 A1* | 9/2010 | Nelson | G02B 3/08 |
| | | | 359/463 |
| 2012/0236403 A1* | 9/2012 | Sykora | G02B 27/2214 |
| | | | 359/463 |

* cited by examiner

STEREOSCOPIC DISPLAY

BACKGROUND OF THE INVENTION

1. Field of the Invention

The present invention relates to a stereoscopic display, in particular, to a portable display that allows an oblique angle of view and displays a stereo image floating in mid-air. The stereoscopic display provides an angle of view natural to the user.

2. Description of Related Art

Generally, conventional stereoscopic displays employ binocular fusion to display stereo images. The images displayed by conventional stereoscopic displays are only viewable from the front, and are unviewable from any other angle. When stereoscopic displays are placed horizontally for situations such as aviation terrain models, building models, 3D medical training, an oblique angle of view is natural to the user. However, conventional stereoscopic displays fail to provide a natural angle of view in the aforementioned situations, thus being inconvenient for the user. Moreover, conventional stereoscopic displays provide the user with visual stimuli in only one direction, i.e., either with the image advancing forward, or withdrawing backward. Therefore, conventional stereoscopic displays fail to provide a vivid sensation that the image is escaping the confines of the plane of display and floating in mid-air.

In this regard, the inventors of the present invention provide a stereoscopic display to address the aforementioned drawbacks.

SUMMARY OF THE INVENTION

The present invention provides a stereoscopic display that allows an oblique angle of view natural to the user when placed horizontally and displays a floating stereo image. The present invention comprises a micro-structure layer to address the drawback of failing to display the stereo image when viewed from an oblique angle of view in conventional stereoscopic displays, so that the user can see the floating stereo image when viewing the horizontally-placed stereoscopic display at a natural angle of view.

To address the above technical problem, the present invention provides a stereoscopic display that allows an oblique angle of view and displays a floating stereo image. The stereoscopic display comprises a flat-panel display and an optical layer disposed thereon, which has a lens array layer and a micro-structure layer. The flat-panel display has a display plane. The lens array layer includes a base and a plurality of lenses with focusing function. The plurality of lenses are disposed on one surface of the base. The lens array layer adjusts light field. The micro-structure layer connects to the lens array layer, and includes a substrate and a plurality of micro structures. The plurality of micro structures are disposed on one side of the substrate. The micro-structure layer modulates the direction of light.

The present invention has at least the following advantages:

The main concept of floating is allowing users to see the stereo image from an oblique angle of view. Therefore the stereoscopic display in the present invention aims to change the angle of view in conventional stereoscopic displays to an oblique angle of view so that the stereo image is seen above the display and causes a vivid floating effect.

The unique technical feature in the present invention is the micro-structure layer, which refracts the light at a refraction angle. This combined with an imaging algorithm allows the stereoscopic display in the present invention to display the stereo image as if it were a real object floating in mid-air.

In order to further the understanding of the present invention, the following embodiments are provided along with illustrations to facilitate the disclosure of the present invention.

BRIEF DESCRIPTION OF THE DRAWINGS

FIG. 10 B is a schematic diagram showing a stereoscopic display with the lens array staggered aligned according to the third embodiment of the present invention;

DETAILED DESCRIPTION OF THE PREFERRED EMBODIMENTS

The aforementioned illustrations and following detailed descriptions are exemplary for the purpose of further explaining the scope of the present invention. Other objectives and advantages related to the present invention will be illustrated in the subsequent descriptions and appended drawings.

First Embodiment

The present invention provides a stereoscopic display, which can be used in optoelectronics, medical, military, display, exhibition, education, entertainment and consumer electronics industries. The stereoscopic display can be used in active and passive 3D displays. The present embodiment is an active stereoscopic display that can display a stereo image as if the object of the image is floating in mid-air, and the stereo image can be seen from an oblique angle of view that is natural to the user. The present embodiment can be placed on tables, ceilings, floors, or any horizontal planes.

Figure 1A:
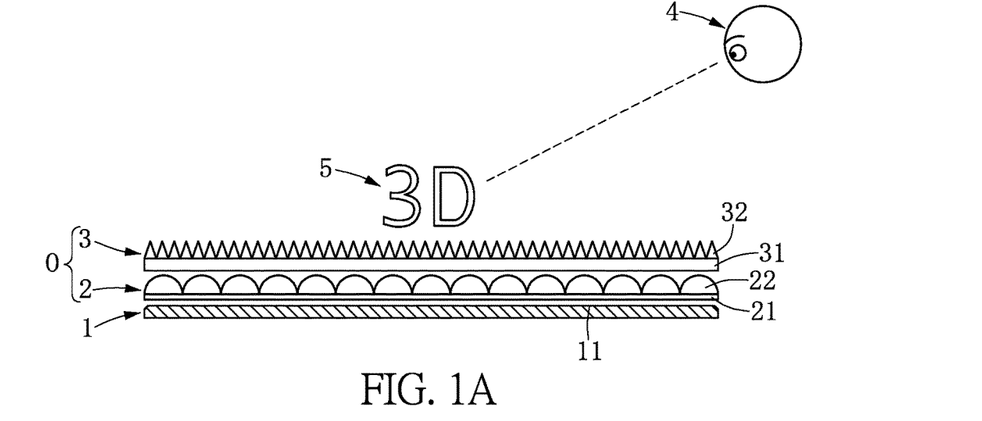
FIG. 1A shows a schematic diagram of a stereoscopic display according to a first embodiment of the present invention.
Figure 1B:
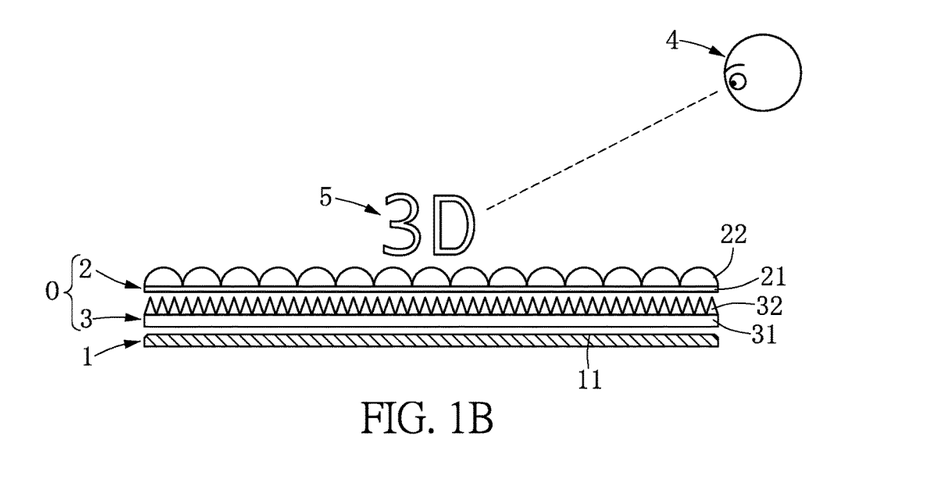
FIG. 1B shows a schematic diagram of a stereoscopic display according to another embodiment of the present invention.

Referring to FIGS. 1A and 1B, the stereoscopic display comprises a flat-panel display 1 and an optical layer O placed thereon. The optical layer O further includes a lens array layer 2 and a micro-structure layer 3. In FIG. 1A, the lens array layer 2 is disposed on the display plane 11 of the flat-panel display 1, the micro-structure layer 3 is disposed on the lens array layer 2. In FIG. 1B, the micro-structure layer 3 is disposed on the display plane 11 of the flat-panel display 1, the lens array layer 2 is disposed on the micro-structure layer 3. The lens array layer 2 is preferably, but not limited to being, in contact with the display plane 11 of the flat-panel display 1. The micro-structure layer 3 is preferably, but not limited to being, in contact with the lens array layer 2. The flat-panel display 1 displays an integral image. The integral image is converged into a floating stereo image by the lens array layer 2. The light field of the stereo image is refracted by the micro-structure layer 3 so that the user 4 can see the stereo image at the display position 5 from an oblique angle of view. It is also possible that the integral image from the flat-panel display 1 is refracted by the micro-structure layer 3, and then converged into a floating stereo image by the lens array layer 2.

Figure 2:
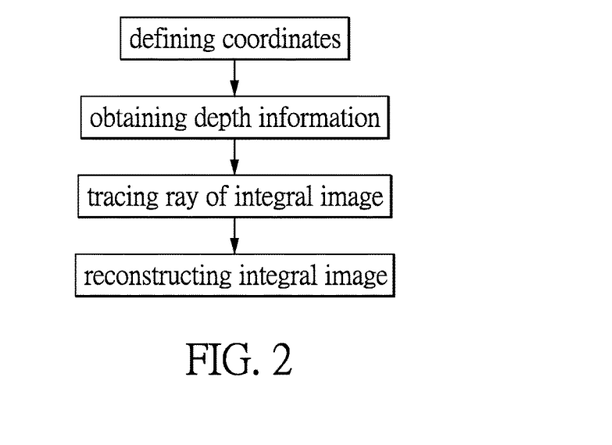
FIG. 2 is a flow diagram of an algorithm employed by a stereoscopic display according to the first embodiment of the present invention.
Figure 3A:
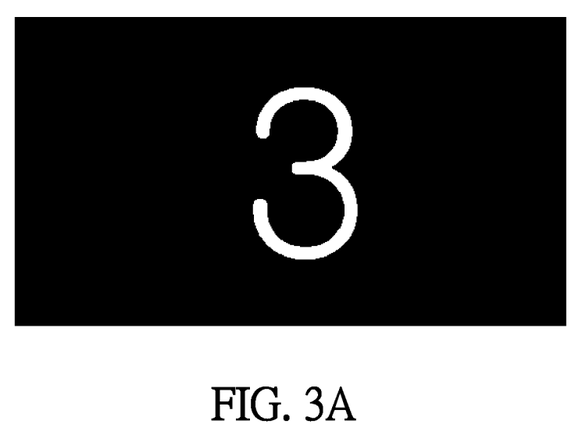
FIG. 3A is a schematic diagram of a raw image before being processed by the algorithm according to the first embodiment of the present invention.
Figure 3B:
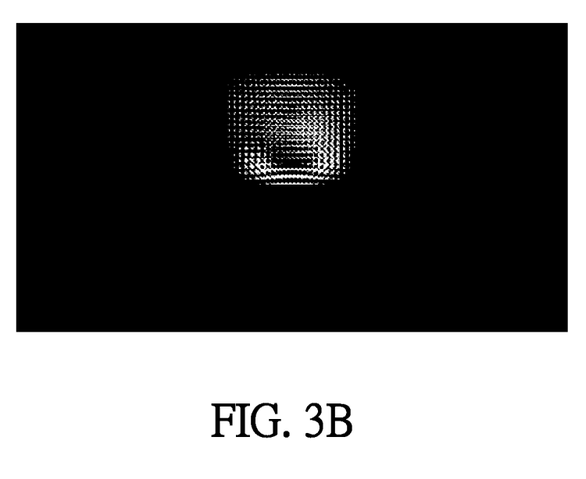
FIG. 3B is a schematic diagram of an integral image after being processed by the algorithm according to the first embodiment of the present invention.

The flat-panel display 1 is provided on a first layer (bottom layer) and displays an image based on an integral photography technology. The flat-panel display 1 may be in any specification as long as an algorithm can be applied. The image displayed by the display plane 11 of the flat-panel display 1 is redrawn based on the algorithm and the specification of the flat-panel display 1. The algorithm requires no image inversion process, and requires only the depth information for calculation. As shown in FIG. 2, the algorithm is applicable to a variety of display panels with different specifications. The algorithm has steps including defining coordinates, obtaining depth information, tracing ray of integral image and reconstructing integral image. FIG. 3A shows a raw image before being processed by the algorithm, and FIG. 3B shows an integral image after being processed by the algorithm. A unique feature of the algorithm in the present invention is that the depth information requires no image inversion process so that the orthoscopic and pseudoscopic issues in conventional integral images are avoided.

The present invention appoints a display position for the stereo image, and then employs the algorithm accordingly. Active flat-panel displays, such as phones, tablets, and flat screens can be used as the flat-panel display 1. The present invention does not intend to limit the type and structure of the flat-panel display 1 as long as the flat-panel display 1 can control the switch of stereo images and achieve an animation effect.

The primary purpose of the flat-panel display 1 is to display the image processed by the algorithm, i.e., the integral image. The algorithm re-encodes the image using a color (RGB) and depth (D) information (i.e., four-dimensional). The effect of the algorithm is shown in FIGS. 3A and 3B. Note that the method of displaying the integral image can be categorized into two groups based on the type of the flat-panel display 1. In the first group, the flat-panel display 1 is an active display that can change the integral images freely and display full-color stereo images, e.g., a flat-screen display, CRT TV, OLED, etc. In the second group, the flat-panel display 1 is a passive display that cannot change the image displayed, such as light boxes, mask patterning, printing graphics, etc.

Figure 4:
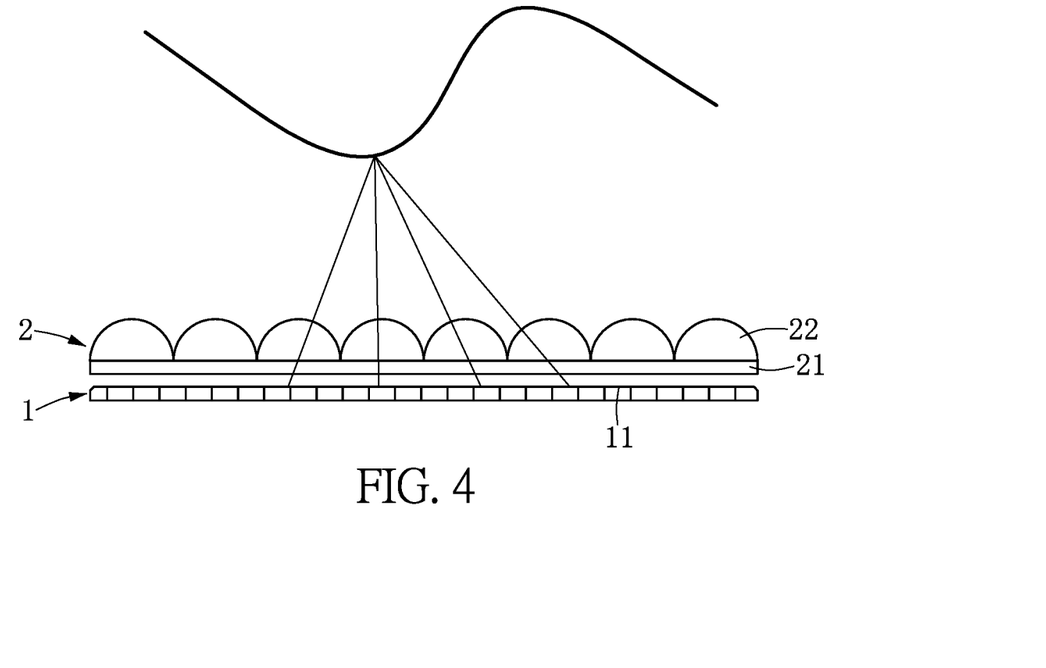
FIG. 4 is a schematic diagram showing a point with depth information formed by converging lights from different lenses according to the first embodiment of the present invention.

The lens array layer 2 is provided on a second layer (middle layer, FIG. 1A) or on a third layer (top layer, FIG. 1B), and controls the light field. A plurality of condenser lenses in the lens array layer 2 control the angle of light of the 3D object, thereby allowing the user to see the stereo image at different angles and generate a perception of depth and dimension of the object. As shown in FIG. 4, different condenser lenses assign different angular information to each point of the object, and the lights from different lenses are converged into a point with depth information in the air. That is, for each point of the object, the lights from different angles are assigned to different pixels of the lenses. The material of the condenser lenses determines the curvature, and the curvature of the condenser lenses as well as the combination of the condenser lenses and the flat-panel display 1 determine the height, the range of viewing angle, and the clarity of the stereo image.

In the present embodiment, the lens array layer 2 is made of a material with good optical characteristics, which includes, but is not limited to, polymethylmethacrylate (PPMA), polycarbonate (PC), polyethylene (PE), glass and other light-transmissive materials. The lens array layer 2 comprises a base 21 and a plurality of lenses 22, the plurality of lenses 22 are disposed on one surface of the base 21. Referring to FIG. 1A, the plurality of lenses 22 are disposed on a surface opposite to the one connected to the flat-panel display 1. Note that the present invention does not intend to limit the arrangement and structure of the lens array layer 2. For example, the plurality of lenses 22 could disposed on a surface connected to the flat-panel display 1 as well. The plurality of lenses 22 have focusing function. The curvature of the plurality of lenses 22 is determined by the material. The curvature of the plurality of lenses 22 as well as the combination of the lens array layer 2 and the flat-panel display 1 determine the height, the range of viewing angle, and the resolution of the stereo image.

Figure 5:
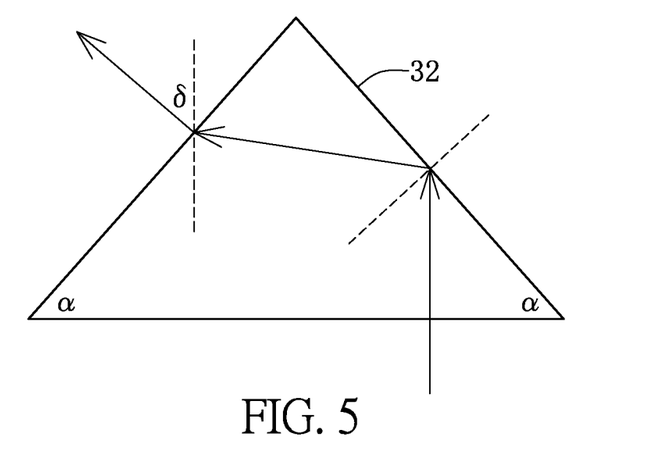
FIG. 5 is a schematic diagram showing a light refracted by single micro structure according to the first embodiment of the present invention.

The micro-structure layer 3 is provided on a third layer (top layer, FIG. 1A) or on a second layer (middle layer, FIG. 1B) to modulate the direction of light. As shown in FIG. 5, the micro-structure layer 3 in the present embodiment includes a plurality of prismatic micro structures that refract the light at an oblique angle, but the present invention is not limited thereto.

The micro-structure layer 3 in the present invention refracts the light at an oblique angle, thus allowing the user to see the stereo image from an oblique angle of view. Particularly, when the flat-panel display 1 is placed horizontally, it is not natural for the user to see the stereo image right above or right below the flat-panel display 1. Conventional stereoscopic displays fail to display viewable images from an oblique angle of view. Therefore, by employing the micro-structure layer 3, the stereoscopic display in the present invention allows the user to see the stereo image naturally from an oblique angle of view.

In the present embodiment, the micro-structure layer 3 can be, but is not limited to, made of polyester (PET), polypropylene (PP) or polycarbonate (PC). The micro-structure layer 3 comprises a substrate 31 and a plurality of micro structures 32. The plurality of micro structures 32 are disposed on one surface of the substrate 31. That is, the plurality of micro structures 32 are disposed on a surface of the substrate 31 opposite to the one connected to the lens array layer 2. In the present embodiment, each of the plurality of micro structures 32 is triangular. Specifically, each of the plurality of micro structures 32 is in a right triangle or an isosceles triangle shape. Note that the present invention does not intend to limit the arrangement and structure of the micro-structure layer 3. Each of the plurality of micro structures 32 is micron-scale.

The micro-structure layer 3 refracts light by its triangular structure. As shown in FIG. 5, the beam angle $\delta$ of light changes with the base angle $\alpha$ of the plurality of micro structures 32. Specifically, the relationship between the beam angle $\delta$ of light and the base angle $\alpha$ of the plurality of micro structures 32 satisfies the equation: $\delta = \sin^{-1}[n \sin(180 - 3\alpha)]$, wherein n is the refractive index of the plurality micro structures 32.

Figure 6:
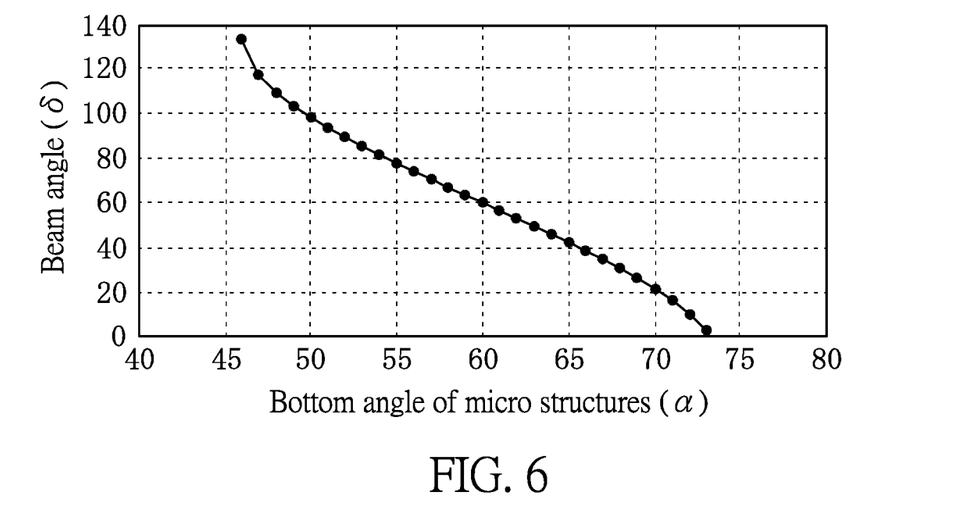
FIG. 6 is a chart showing the relationship between the base angle of a micro structure and the beam angle of light according to the first embodiment of the present invention.

FIG. 6 shows the relationship between the base angle $\alpha$ of the plurality of micro structures 32 and the beam angle $\delta$ of light, wherein each of the plurality of micro structures 32 is in an isosceles triangle shape. By varying the design of the base angle $\alpha$, the beam angle $\delta$ can range from 5 degrees to 130 degrees. That is, the beam angle $\delta$ can vary from 5 degrees to 130 degrees relative to vertical, depending on the base angle $\alpha$ of the plurality of micro structures 32. Therefore, optimal viewing experience under different contexts can be achieved by varying the design of the plurality of micro structures 32.

Figure 7:
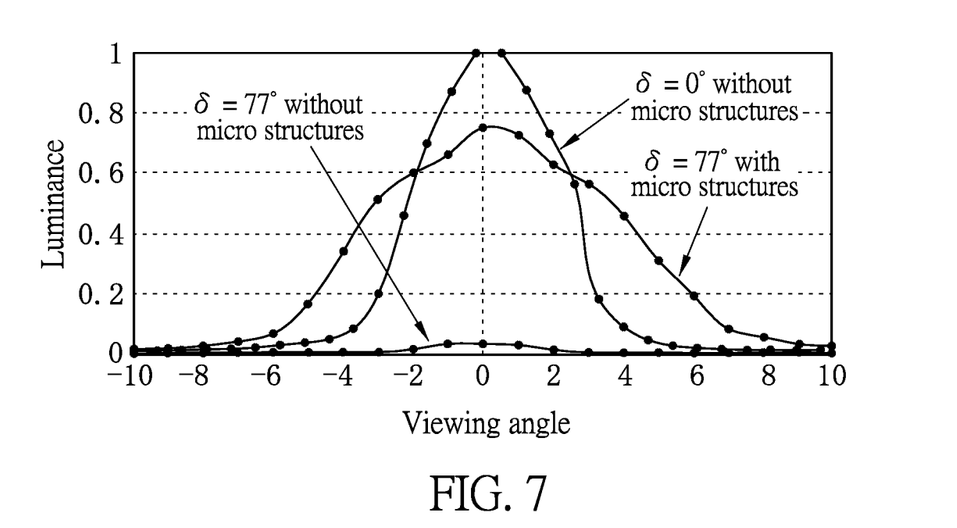
FIG. 7 is a chart showing the variation of luminance as the angle of view set to 77 degrees according to the first embodiment of the present invention.

FIG. 7 shows the variation of luminance as the angle of view is set at 77 degrees. The luminance is 100% when the angle of view is set at 0 degrees (i.e., view from the front) without the plurality of micro structures 32. However, the luminance drops abruptly to less than 3% when the angle of view is set at 77 degrees without the plurality of micro structures 32. After adding the micro-structure layer 3, the luminance increases significantly to 75%, so that the quality of image under an oblique angle of view is improved substantially.

The present invention employs a three-layer design. The lights from the flat-panel display 1 are converged by the lens array 2 and reintegrated into a stereo image floating in mid-air. The micro-structure layer 3 shifts the angle of view of the stereo image to an oblique direction, which is convenient and ergonomically proper for the user.

Second Embodiment

Figure 8:
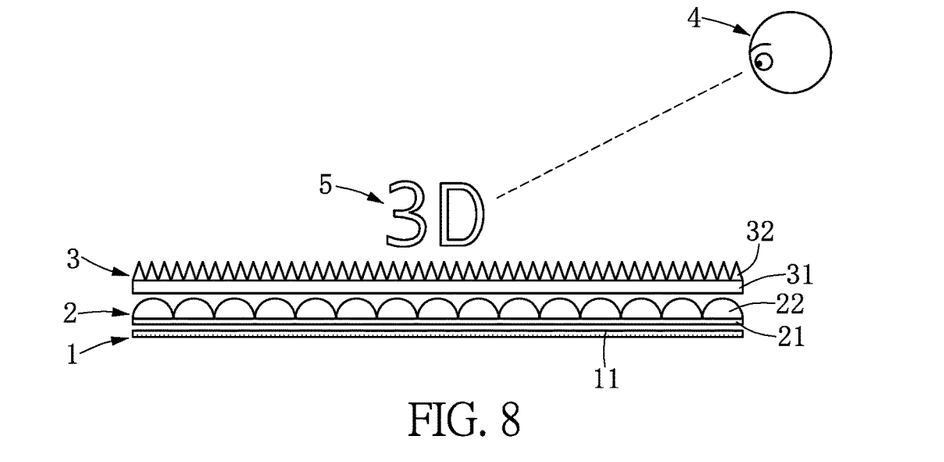
FIG. 8 is a schematic diagram of a stereoscopic display according to a second embodiment of the present invention.

The present invention can also apply to passive stereoscopic floating displays that display drawings or engravings. Similar to the first embodiment, the present embodiment comprises a three-layer structure. As shown in FIG. 8, the stereoscopic display comprises a flat-panel display 1, a lens array layer 2 and a micro-structure layer 3. The main difference between the first and the second embodiments lies in the flat-panel display 1. The passive flat-panel display device 1 in the present embodiment can be a reflection type or a transmission type display. The integral image is converged in the air and shown as a stereo image. Then, the micro-structure layer 3 refracts the light field at an oblique angle so that the user 4 in the oblique direction can see the stereo image displayed at the display position 5.

Figure 9A:
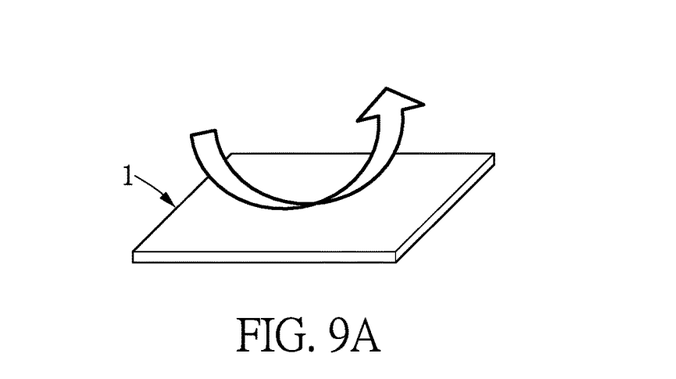
FIG. 9A is a schematic diagram of a stereoscopic display employing a reflection type display according to the second embodiment of the present invention.
Figure 9B:
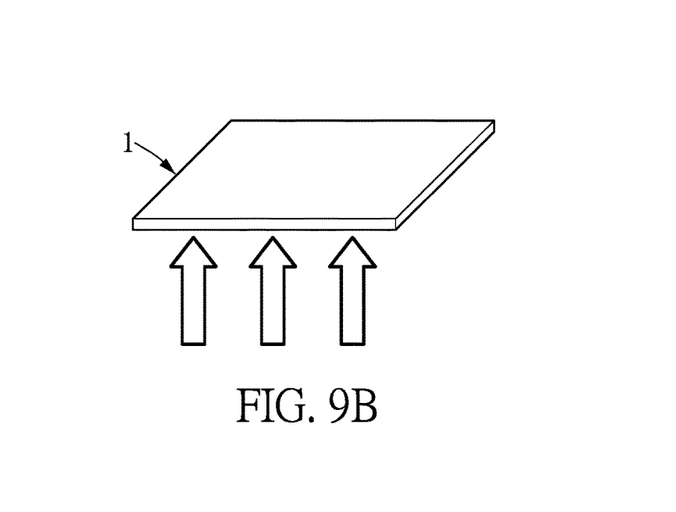
FIG. 9B is a schematic diagram of a stereoscopic display employing a transmission type display according to the second embodiment of the present invention.

Passive displays do not include a light source and display images with external light sources. Passive displays can be divided into the transmission type and reflection type display as shown in FIGS. 9A and 9B. Passive displays can be placed on tables, ceilings, floors, or any flat surfaces.

The reflection type flat-panel display 1 (display panel) employs the principle of ambient light reflection by a colored object to engrave or print the calculated integral image on an opaque plate. The ambient light reflected by the integral image passes through the lens array layer 2 and the micro-structure layer 3 so that the user sees the stereo image of a still picture.

Transmission type flat-panel displays, on the other hand, include a backlight to display the engraved or printed integral image. The backlight transmits the integral image and passes through the lens array layer 2 and the micro-structure layer 3 so that the user sees the stereo image of a still picture.

By employing the same lens array layer 2 and the micro-structure layer 3, passive stereoscopic floating displays allow the user to see the stereo image floating in mid-air. Compared with active displays, passive displays have higher resolution and are capable of displaying a more sophisticated stereo image.

Third Embodiment

The present invention employs the integral photography technology, which uses light field imaging. The light field imaging records 3D spatial and angular information, and generates a five-dimensional data (x, y, z, u, v). Integral Imaging technology, on the other hand, uses the optical element, i.e., the lens array layer 2, as a medium for the angular information of the light field to record the spatial and angular information in the photosensitive element. When displaying the stereo image, the user simultaneously receives the position and direction of the light, thus building the perception of depth of the image.

Figure 10A:
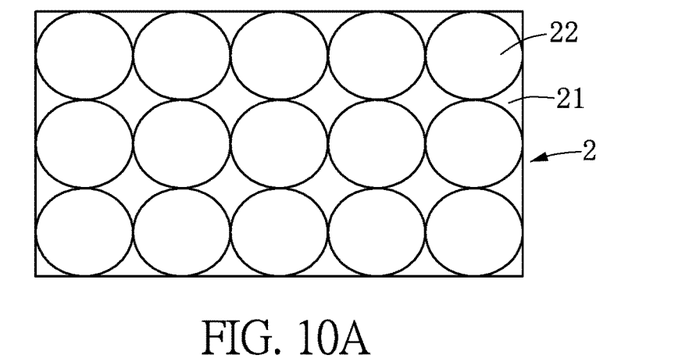
FIG. 10A is a schematic diagram showing a stereoscopic display with the lens array parallel aligned according to a third embodiment of the present invention.
Figure 10B:
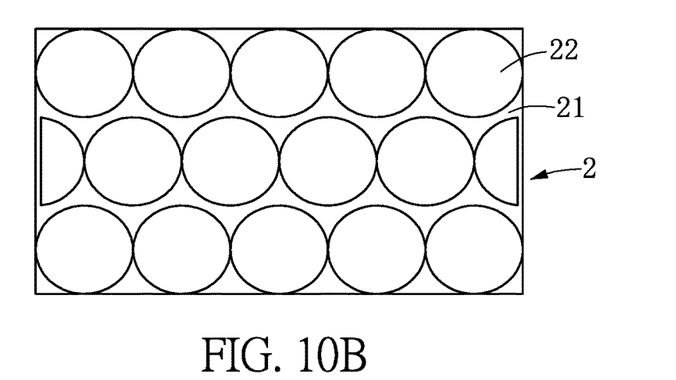

There is a close relationship between the structure of the lens array layer 2 and the effect of display. As shown in FIGS. 10A and 10B, the lens array can be rectangularly aligned or hexagonally aligned, respectively. That is, the adjacent lenses can be parallel aligned (FIG. 10A) or staggered aligned (FIG. 10B). Both alignments of the lens array can display the stereo image.

Figure 11:
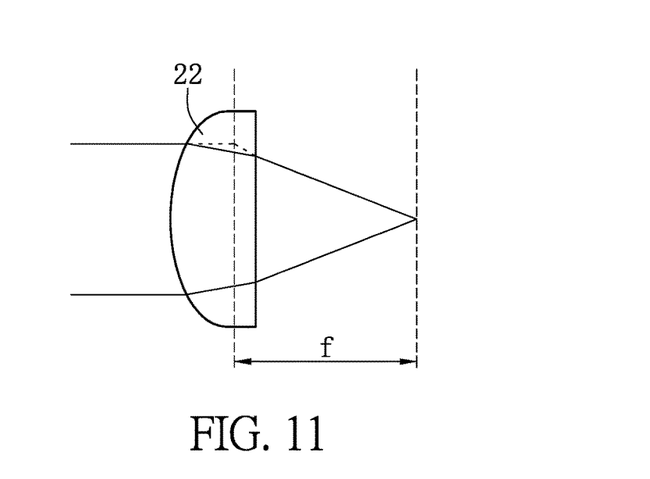
FIG. 11 is a schematic diagram showing single lens focus light according to the third embodiment of the present invention.

The micro-structure layer 3 connecting to the lens array layer 2 includes a plurality of lenses with focusing function. The refractive index n of the material that the plurality of lenses are made of determines the focusing function. An applicable material for the plurality of lenses satisfies the following requirements: the refractive index ranges from 1.3 to 3.0, the light transmittance is 70% or more, the reflectance is 25% or less, and the applicable wavelength of light ranges from 300 nm to 1100 nm. As shown in FIG. 11, each of the plurality of lenses satisfies the following Lensmaker's equation:

$$\frac{1}{f} = (n-1)\left(\frac{1}{R1} + \frac{1}{R2}\right)$$

Wherein R1 and R2 are the respective radius of curvature of bilateral surfaces of each of the plurality of lenses, f is the focal length, and n is the refractive index. In addition, the diameter of each of the plurality of lenses ranges from 10 um to 3 cm, depending on the size of the display panel.

Fourth Embodiment

Figure 12A:
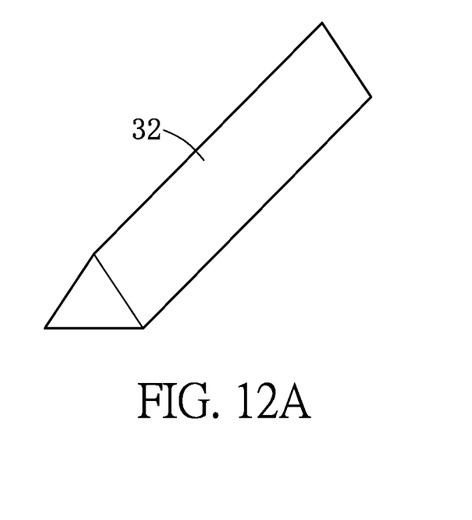
FIG. 12A is a schematic diagram showing a prismatic micro structure according to a fourth embodiment of the present invention.
Figure 12B:
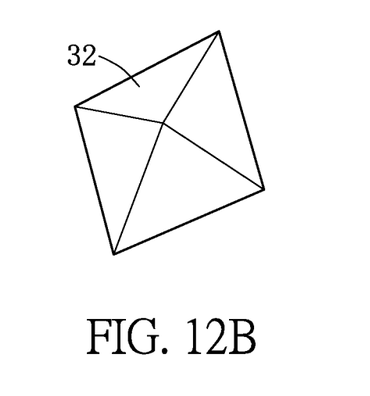
FIG. 12B is a schematic diagram showing a pyramidal micro structure according to the fourth embodiment of the present invention.
Figure 12C:
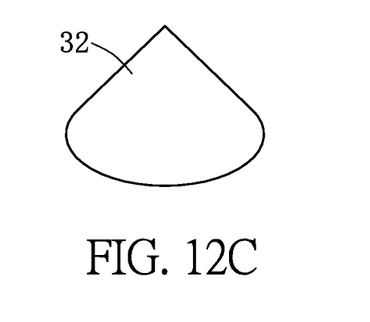
FIG. 12C is a schematic diagram showing a conical micro structure according to the fourth embodiment of the present invention.

Referring to FIGS. 12A, 12B and 12C, each of the plurality of micro structures 32 can be prismatic (shown in FIG. 12A), and the plurality of prismatic micro structures 32 direct the light to two directions. The plurality of prismatic micro structures 32 can also be replaced by pyramid structures (shown in FIG. 12B), so as to direct the light to four directions. Furthermore, the plurality of micro structures 32 can also be conical (shown in FIG. 12C) so that the light field distributes horizontally and achieves an all-round angle of view in the horizontal plane. The refractive index n of the material which the plurality of micro structures 32 are made of is an important parameter for the beam angle. The refractive index n ranges from 1.3 to 3.0, the light transmittance is 70% or more, the reflectance is 25% or less, and an applicable wavelength of light ranges from 300 nm to 1100 nm.

Figure 12D:
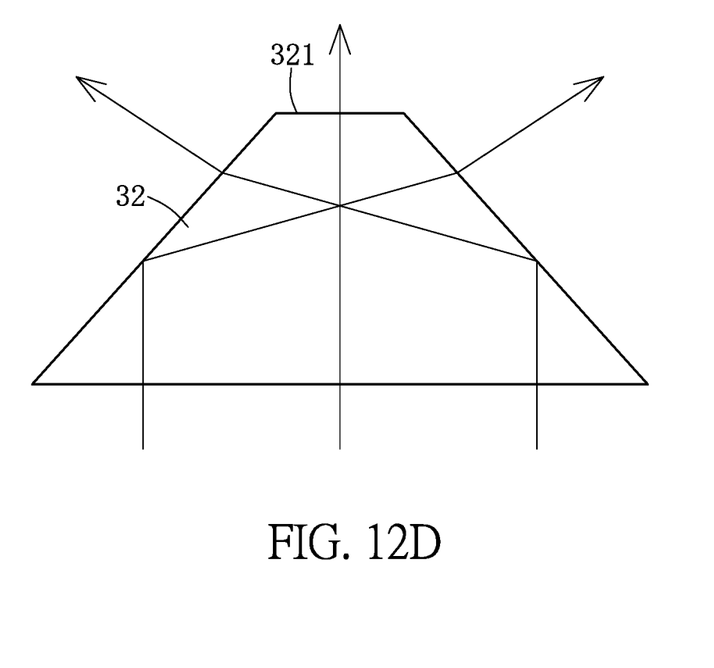
FIG. 12D is a schematic diagram showing a micro structure having a cut plane at the top according to the fourth embodiment of the present invention.

Referring to FIG. 12D, the design of the plurality of micro structures 32 that aims to offer an oblique angle of view to the user can be modified. In this embodiment, each of the plurality of micro structures 32 has a cut plane 321 at the top, which is in parallel with the bottom surface of the plurality of micro structures 32. Therefore each of the plurality of micro structures 32 includes a direct-through region so that the user can see the stereo image when viewing from the front.

Therefore, the present invention provides a stereoscopic display that allows an oblique angle of view. The stereoscopic display controls the direction of light from each pixel unit of the display by the optical elements. The present invention comprises simple optical elements including the flat-panel display 1, the lens array layer 2 and the micro-structure layer 3. The optical elements are integrated into an optical package and placed on a display screen to build a stereoscopic floating display. By properly designing the pixel size, the space between optical films, the size and focal length of the lens, and employing the principle of integral imaging and combining a calculated image signal, the stereoscopic display in the present invention can display the stereo image in 3D space. Finally, the triangle design of the micro structures in the optical film refracts the stereo image to an oblique angle of view so that the present invention can be more suitable for general display applications.

The descriptions illustrated supra set forth simply the preferred embodiments of the present invention; however, the characteristics of the present invention are by no means restricted thereto. All changes, alterations, or modifications conveniently considered by those skilled in the art are deemed to be encompassed within the scope of the present invention delineated by the following claims.

What is claimed is:

1. A stereoscopic display having an oblique angle of view and displaying a stereo image floating in mid-air, comprising:
    a flat-panel display having a display plane;
    an optical layer having a lens array layer that adjusts light field and a micro-structure layer that modulates a direction of light, and being disposed on the display plane;
    wherein the lens array layer includes a base and a plurality of lenses with focusing function, the plurality of lenses being disposed on one surface of the base;
    wherein the micro-structure layer connects to the lens array layer, and includes a substrate and a plurality of micro structures, the plurality of micro structures being disposed on one surface of the substrate.

2. The stereoscopic display according to claim 1, wherein the flat-panel display employs an algorithm, and displays an integral image based on the algorithm and a specification of the flat-panel display.

3. The stereoscopic display according to claim 1, wherein the flat-panel display is an active or a passive display.

4. The stereoscopic display according to claim 1, wherein the flat-panel display includes a reflection type display or a transmission type display.

5. The stereoscopic display according to claim 1, wherein each of the plurality of micro structures is in an isosceles triangle or a right triangle shape.

6. The stereoscopic display according to claim 1, wherein a beam angle of the plurality of micro structures ranges from 5 degrees to 130 degrees relative to vertical.

7. The stereoscopic display according to claim 1, wherein a beam angle of each of the plurality of micro structures is $\delta$, a base angle of each of the plurality of micro structures is $\alpha$, a refractive index of each of the plurality of micro structures is n, and the following equation is satisfied: $\delta = \sin^{-1}[n \sin(180-3\alpha)]$.

8. The stereoscopic display according to claim 1, wherein each of the plurality of micro structures is prismatic, pyramidal or conical.

9. The stereoscopic display according to claim 1, wherein a refractive index of the plurality of micro structures ranges from 1.3 to 3.0, a light transmittance of the plurality of micro structures is 70% or more, a reflectance of the plurality of micro structures is 25% or less, an applicable wavelength of light ranges from 300 nm to 1100 nm.

10. The stereoscopic display according to claim 1, wherein each of the plurality of micro structures has a cut plane at the top, and the cut plane is in parallel with a bottom surface of each of the plurality of micro structures.

* * * * *